United States Patent

Aumond

[11] Patent Number: 5,911,470
[45] Date of Patent: Jun. 15, 1999

[54] VEHICLE SEAT INCLUDING AN ARMREST INTEGRATED IN THE SEAT PROPER

[75] Inventor: Jean-Claude Aumond, Etrechy, France

[73] Assignee: Bertrand Faure Equipements SA, Boulogne, France

[21] Appl. No.: 09/095,688

[22] Filed: Jun. 10, 1998

[30] Foreign Application Priority Data

Jun. 11, 1997 [FR] France ................................. 97 07236

[51] Int. Cl.⁶ .............................. A47C 13/00; A47C 7/54
[52] U.S. Cl. ................... 297/115; 297/237; 297/188.09; 297/411.3
[58] Field of Search ................................. 297/237, 115, 297/188.09, 188.1, 344.15, 344.14, 411.3, 411.32, 411.36

[56] References Cited

U.S. PATENT DOCUMENTS

| | | |
|---|---|---|
| 2,771,123 | 11/1956 | Clark . |
| 2,893,473 | 7/1959 | Pitts et al. . |
| 2,955,648 | 10/1960 | Krajewski ................................. 297/115 |
| 3,191,995 | 6/1965 | Shelton . |
| 3,779,600 | 12/1973 | Quakenbush ......................... 297/411.3 |
| 4,685,729 | 8/1987 | Heesch et al. . |
| 5,265,934 | 11/1993 | Forget . |
| 5,516,194 | 5/1996 | Maule ...................................... 297/115 |
| 5,609,392 | 3/1997 | Stigson .................................... 297/237 |

FOREIGN PATENT DOCUMENTS

| | | |
|---|---|---|
| 0 597 519 A1 | 5/1994 | European Pat. Off. . |
| 0 633 159 A1 | 1/1995 | European Pat. Off. . |
| 0 650 864 A1 | 5/1995 | European Pat. Off. . |
| 43 28 493 A1 | 3/1995 | Germany . |

OTHER PUBLICATIONS

French Preliminary Search Report dated Jan. 20, 1998, French Application FR 9707236 filed Jun. 11, 1997.

Primary Examiner—Peter M. Cuomo
Assistant Examiner—Anthony D. Barfield
Attorney, Agent, or Firm—Marshall, O'Toole, Gerstein, Murray & Borun

[57] ABSTRACT

A vehicle seat has a seat proper fitted with an integrated armrest which is movable between a retracted position where the armrest forms an integral portion of the seat proper and a raised position where the armrest is moved upwards and rearwards by a strut mechanism, with the armrest then resting on a rear portion of the seat proper.

11 Claims, 2 Drawing Sheets

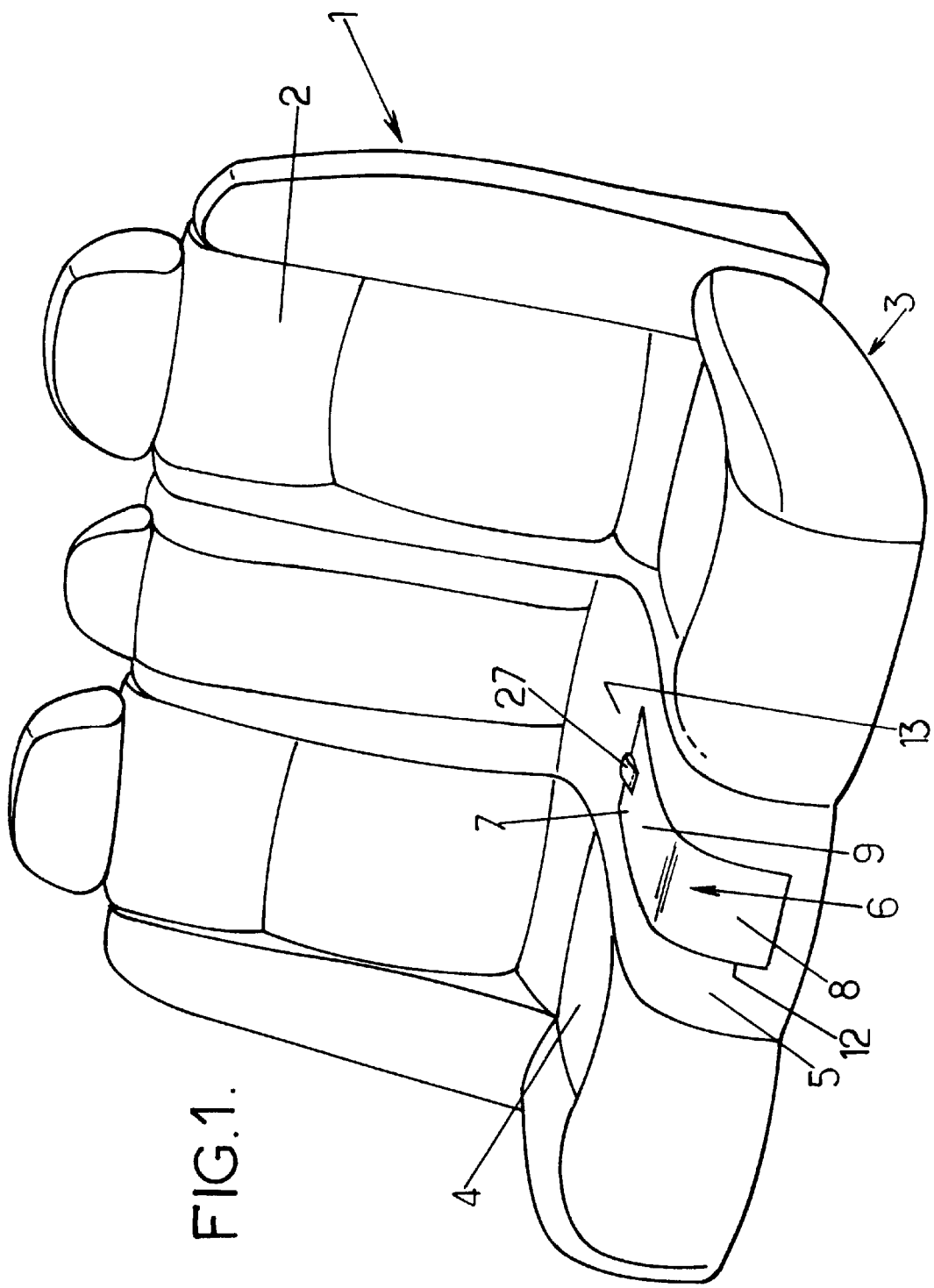

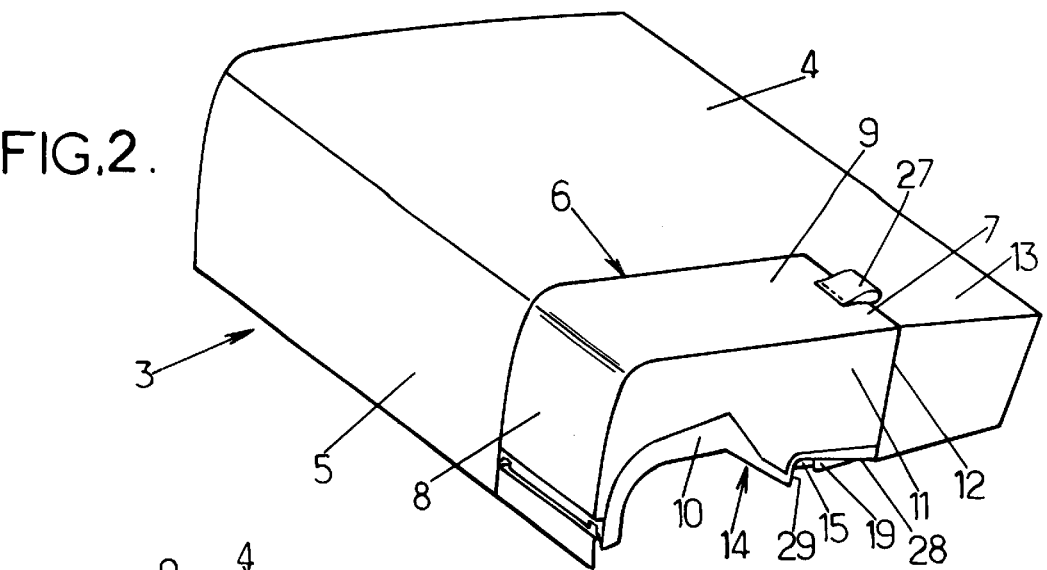
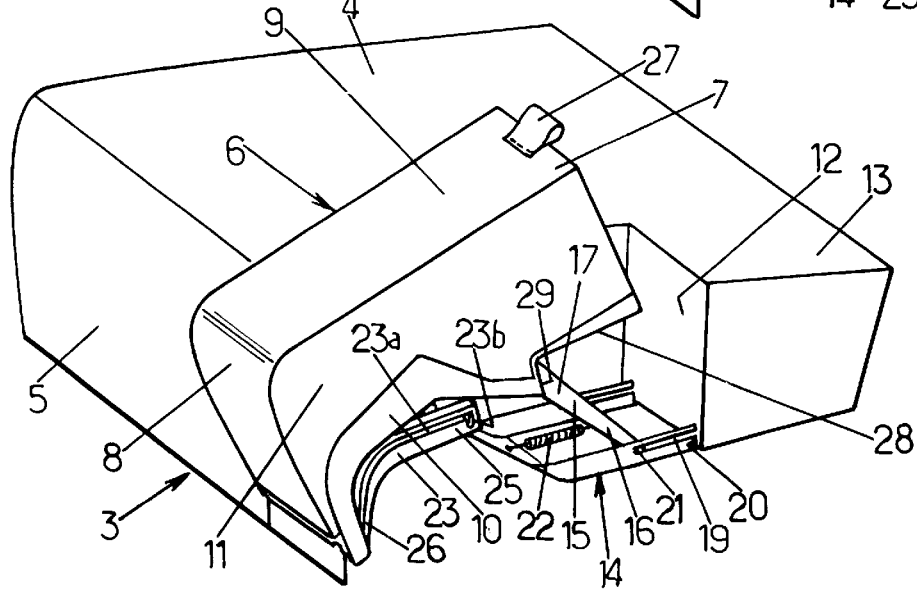
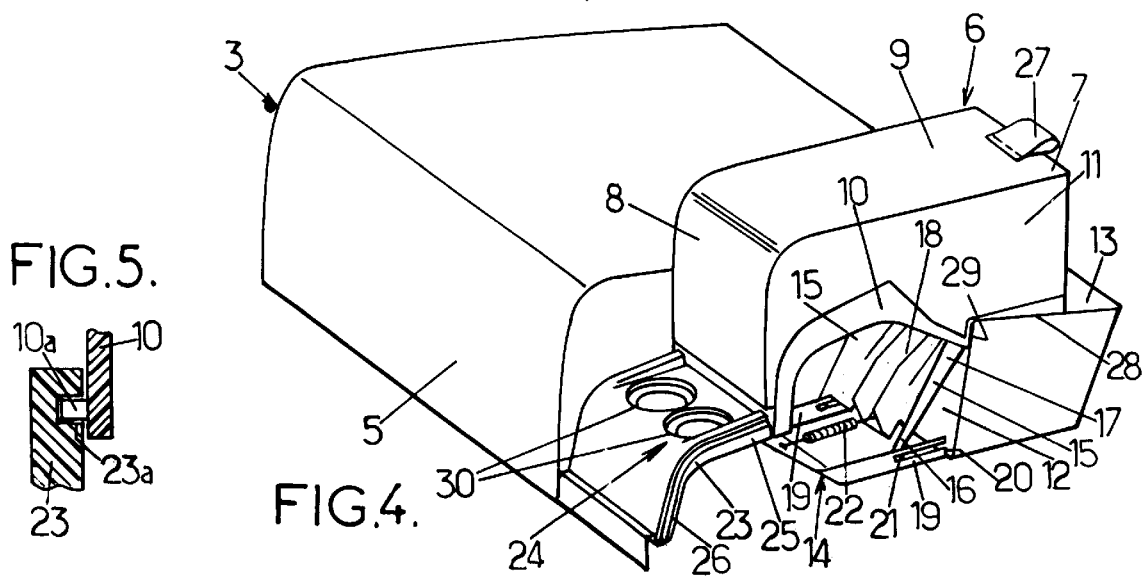

VEHICLE SEAT INCLUDING AN ARMREST INTEGRATED IN THE SEAT PROPER

FIELD OF THE INVENTION

The present invention relates to a vehicle seat including an armrest integrated in the seat proper.

More particularly, the invention relates to a vehicle seat comprising:

a seat back;

a seat proper provided with a padded horizontal top surface which extends over a certain width from the seat back to a front edge; and an armrest integrated in the seat proper, said armrest extending parallel to the width of the seat proper between rear and front ends, said armrest having a padded horizontal top surface which is at substantially the same level as the top surface of the seat proper when the armrest is in a retracted position in which the armrest is situated in a housing formed in the seat proper to receive it, and the top surface of the armrest being situated above the level of the top surface of the seat proper when said armrest is in a raised position in which it is at least partially extracted from its housing, the armrest being connected to the seat proper by means of a bistable raising mechanism which is movable between two abutment positions corresponding respectively to the retracted position and to the raised position of the armrest, said mechanism including at least one strut having a first end hinged to the seat proper and a second end hinged to the armrest, said strut extending forwards from its first end when the armrest is in the retracted position, and said strut sloping upwards and backwards from its first end when the armrest is in its raised position.

BACKGROUND OF THE INVENTION

Document U.S. Pat. No. 3 191 995 describes a seat of that type, including a raising mechanism that is complex and expensive.

OBJECTS AND SUMMARY OF THE INVENTION

A particular object of the present invention is thus to mitigate those drawbacks.

To this end, according to the invention, in a seat of the kind in question the seat proper further includes, in the vicinity of its front edge, at least a first slideway extending parallel to the width of the seat proper between rear and front ends, the front end of the armrest being slidably mounted on said first slideway.

In preferred embodiments of the invention use may optionally be made of one or more of the following dispositions:

the seat proper has a rear portion which is disposed between the seat back and the housing for receiving the armrest, the armrest having a horizontal bottom surface towards its rear end, which surface bears vertically on said rear portion of the seat proper when said armrest is in its raised position;

the bottom surface of the armrest is defined by a shoulder which penetrates into the housing for receiving the armrest and which comes horizontally into abutment against the rear portion of the seat proper when the armrest is in its raised position;

the second end of the strut is hinged on the armrest in the vicinity of the rear end of said armrest;

the front end of the first slideway is curved substantially vertically downwards so that the front end of the armrest moves downwards when said armrest passes into its retracted position;

the first slideway includes a groove in which there slides a stud secured to the armrest, said groove having a downwardly directly notch at the rear end of the first slideway, and said notch being adapted to receive the stud when the armrest is in its raised position, thereby locking the armrest in said position;

the first end of the strut is slidably mounted to a second slideway which extends parallel to the width of the seat proper between rear and front ends, the second end of the strut being situated in front of the front end of the second slideway when the front end of the armrest is level with the front end of the first slideway, such that the first end of the strut then slides towards the rear end of the second slideway when the armrest is pushed manually down into is retracted position, and the armrest further includes means for positioning the first end of the strut at the front end of the second slideway when the armrest is in the raised position;

the first end of the strut is urged forwards by resilient means so that said first end slides forwards towards the front end of the second slideway when the armrest passes into its raised position, with the bistable mechanism including abutment means which counter the action of said resilient means when the armrest is in the retracted position;

said abutment means are constituted by the front end of the first slideway which prevents the armrest from moving forwards under drive from the resilient means when said armrest is in the retracted position while the second end of the strut is not situated at a level higher than the first end of said strut when the armrest is in its retracted position, such that the resilient means then have no tendency to raise the armrest;

towards its rear end the armrest includes a member for grasping, said member being accessible to a user when said armrest is in the retracted position; and the seat proper includes at least one beaker-carrier disposed in the housing for the armrest in the vicinity of the front edge of the seat proper, said beaker-carrier being covered by the armrest when said armrest is in its retracted position, the front end of the armrest being situated behind said beaker-carrier when said armrest is in its raised position.

BRIEF DESCRIPTION OF THE DRAWINGS

Other characteristics and advantages of the invention appear from the following description of an embodiment thereof given by way of non-limiting example and with reference to the accompanying drawings.

In the drawings:

FIG. 1 is a diagrammatic perspective view of a vehicle seat constituting an embodiment of the invention, with its armrest in the retracted position;

FIG. 2 is a fragmentary section view of the seat of FIG. 1;

FIGS. 3 and 4 are views similar to FIG. 2 respectively while the armrest is being raised and when the armrest is in the raised position; and FIG. 5 is a detail view showing one of the slideways for the armrest of the seat of FIGS. 1 to 4.

MORE DETAILED DESCRIPTION

In the figures, the same references are used to designate elements that are identical or similar.

FIG. 1 shows a vehicle seat 1, and more particularly a motor vehicle back seat of the bench type comprising a seat back 2 and a seat proper 3.

The seat proper 3 has a padded horizontal top surface 4 which extends over a certain width from the back 2 towards a front edge 5.

In addition, an armrest 6 is integrated in the seat 3. This armrest extends parallel to the width of the seat between a rear end 7 and a front end 8, and said armrest itself has a padded horizontal top surface 9.

As can be seen in FIG. 2, the armrest 6 may advantageously include a bottom shell 10, e.g. made of molded plastics material, and top padding 11 which forms the top surface 9 of the armrest and also the major fraction of the four side faces thereof.

When the armrest 6 is in the retracted position, as shown in FIGS. 1 and 2, it is entirely received in a housing 12 formed in the seat proper 3 and opening out both in the top face 4 and in the front edge 5 of the seat, with the seat proper 3 nevertheless including a rear portion 13 between the housing 12 and the seat back 2.

In the retracted position of the armrest 6, its top surface 9 is at substantially the same level as the top surface 4 of the seat proper, and the front end 8 of the armrest is preferably likewise substantially in alignment with the front edge 5 of the seat.

Starting from its retracted position, the armrest 6 can be moved manually into a raised position, as shown in FIGS. 3 and 4, by means of a bistable raising mechanism 14 which is movable between two abutment positions corresponding respectively to the retracted position and to the raised position of the armrest, the mechanism comprising:

two parallel struts 15 each extending between a first end 16 hinged to the seat proper and a second end 17 pivotally mounted on the shell 10 of the armrest, the two struts 15 preferably being interconnected by a rigid spacer 18;

two slideways 19 secured to the seat proper, each extending horizontally parallel to the width of the seat between rear ends 20 and front ends 21, and in which the pivots formed at the first ends 16 of the struts 15 are respectively slidably received;

at least one traction spring 22 mounted between the bottom portion of the spacer 18 substantially at the same level as the slideways 19, and the shell 10 in the vicinity of the front end 8 of the armrest, so as to urge the first ends 16 of the struts 15 resiliently forwards; and two parallel slideways 23, only one of which is visible in the figures, constituted by the two sides of a rigid plate 24 which is advantageously internally formed with the slideways 19 and which forms the bottom of the housing 12 for receiving the armrest, each of these two slideways 23 extending parallel to the width of the seat proper between a rear end 25 and a front end 26 that is curved substantially vertically downwards, with the front portion of the shell 10 including two studs 10a which slide in grooves 23a of said slideways 23 (see FIG. 5).

When the armrest 6 is initially in its retracted position, as shown in FIG. 2, the first ends 16 of the struts 15 are at the rear end 20 of the slideways 19, and the struts 15 extend substantially horizontally.

The action of the spring 22 is then countered because:

the second end 17 of each strut 15 is not situated significantly above the first end 16 of said strut so the struts 15 have no tendency to raise the rear end of the armrest; and the front end of the slideway 23 then prevents the armrest from moving forwards under drive from the spring 22.

Starting from this position, when a user seeks to move the armrest 6 into its raised position, it is necessary to raise the rear end 7 of the armrest by means of a tab 27 or some other means for taking hold of the rear end 7 of the armrest and accessible from the top face 4 of the seat when the armrest is in the retracted position.

The armrest 6 then moves into the position shown in FIG. 3 where its front end 8 is still situated at the first ends 26 of the slideways 23, but in which its rear end 7 has been raised.

The first end 16 of each strut 15 is then situated at the front end 21 of the corresponding slideway 19, and said struts slope forwards and upwards from their first ends 16 towards their second ends 17.

It will be observed that the movement of raising the rear end 7 of the armrest is assisted by the spring 22 once the raising movement has been started by the user.

From the position shown in FIG. 3, the user then pulls the armrest backwards, e.g. by means of the tab 27 so that the front end 8 of the armrest slides to the rear ends of the slideways 23 (see FIG. 4) while the struts 15 pivot backwards to a position in which said struts slope upwards and backwards from their first ends 16 towards their second ends 17, the first ends 16 of said struts being held at the front ends 21 of the slideways 19 by the action of the spring 22.

At the end of this movement, the bottom horizontal surface 28 of the shell 10 rests vertically on the rear portion 13 of the seat proper, while a shoulder 29 on the shell 10 defining the edge of said surface 28 comes into horizontal abutment against said rear portion 13 of the seat proper from the inside of the housing 12 for receiving the armrest.

In addition, the studs 10a on the armrest then penetrate into notches 23b which extend the grooves 23a downwards at the rear ends of the slideways 23 (FIG. 3), thereby locking the armrest in its raised position.

The raised position of the armrest is thus particularly stable.

Finally, in order to return the armrest 6 from its raised position to its retracted position, it suffices:

to raise the front end 8 of the armrest slightly so as to extract the studs 10a from the notches 23b;

to cause the armrest to slide forwards as far as possible; and to press the rear end 7 of the armrest down into the housing 12.

Advantageously, the plate 24 on which the slideways 23 are formed also includes beaker-receiving recesses 30 located close to the front edge 5 of the seat, which recesses are covered by the armrest when it is in its retracted position, but become accessible to a user when the armrest is in its raised position, thus enabling beakers or other receptacles to be received.

I claim:

1. A vehicle seat comprising:

a seat back;

a seat proper provided with a padded horizontal top surface which extends over a certain width from the seat back to a front edge; and an armrest integrated in the seat proper, said armrest extending parallel to the width of the seat proper between rear and front ends, said armrest having a padded horizontal top surface which is at substantially the same level as the top surface of the seat proper when the armrest is in a retracted position in which the armrest is situated in a housing formed in the seat proper to receive it, and the top surface of the armrest being situated above the level of the top surface of the seat proper when said armrest is in a raised position in which it is at least partially extracted from its housing, the armrest being connected to the seat proper by means of a bistable raising mechanism which is movable between two abutment positions corresponding respectively to the retracted position and to the raised position of the armrest, said mechanism including at least one strut having a first end hinged to the seat proper and a second end hinged to the armrest, said strut extending forwards from its first end when the armrest is in the retracted position, and said strut sloping upwards and backwards from its first end when the armrest is in its raised position, wherein the seat proper further includes, in the vicinity of its front edge, at least a first slideway extending parallel to the width of the seat proper between rear and front ends, the front end of the armrest being slidably mounted on said first slideway.

2. A seat according to claim 1, in which the seat proper has a rear portion which is disposed between the seat back and the housing for receiving the armrest, the armrest having a horizontal bottom surface towards its rear end, which surface bears vertically on said rear portion of the seat proper when said armrest is in its raised position.

3. A seat according to claim 1, in which the bottom surface of the armrest is defined by a shoulder which penetrates into the housing for receiving the armrest and which comes horizontally into abutment against the rear portion of the seat proper when the armrest is in its raised position.

4. A seat according to claim 1, in which the second end of the strut is hinged on the armrest in the vicinity of the rear end of said armrest.

5. A seat according to claim 1, in which the front end of the first slideway is curved substantially vertically downwards so that the front end of the armrest moves downwards when said armrest passes into its retracted position.

6. A seat according to claim 5, in which the first slideway includes a groove in which there slides a stud secured to the armrest, said groove having a downwardly directly notch at the rear end of the first slideway, and said notch being adapted to receive the stud when the armrest is in its raised position, thereby locking the armrest in said position.

7. A seat according to claim 1, in which the first end of the strut is slidably mounted to a second slideway which extends parallel to the width of the seat proper between rear and front ends, the second end of the strut being situated in front of the front end of the second slideway when the front end of the armrest is level with the front end of the first slideway, such that the first end of the strut then slides towards the rear end of the second slideway when the armrest is pushed manually down into is retracted position, and the armrest further includes means for positioning the first end of the strut at the front end of the second slideway when the armrest is in the raised position.

8. A seat according to claim 7, in which the first end of the strut is urged forwards by resilient means so that said first end slides forwards towards the front end of the second slideway when the armrest passes into its raised position, with the bistable mechanism including abutment means which counter the action of said resilient means when the armrest is in the retracted position.

9. A seat according to claim 8, in which said abutment means are constituted by the front end of the first slideway which prevents the armrest from moving forwards under drive from the resilient means when said armrest is in the retracted position while the second end of the strut is not situated at a level higher than the first end of said strut when the armrest is in its retracted position, such that the resilient means has no tendency to raise the armrest.

10. A seat according to claim 1, in which, towards its rear end, the armrest includes a member for grasping, said member being accessible to a user when said armrest is in the retracted position.

11. A seat according to claim 1, in which the seat proper includes at least one beaker-carrier disposed in the housing for the armrest in the vicinity of the front edge of the seat proper, said beaker-carrier being covered by the armrest when said armrest is in its retracted position, the front end of the armrest being situated behind said beaker-carrier when said armrest is in its raised position.

* * * * *